(12) United States Patent
Vinande (10) Patent No.: US 10,323,939 B1
(45) Date of Patent: Jun. 18, 2019

(54) NAVIGATION APPARATUS

(71) Applicant: The United States of America, as represented by the Secretary of the Air Force, Washington, DC (US)

(72) Inventor: Eric T. Vinande, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 336 days.

(21) Appl. No.: 15/467,705

(22) Filed: Mar. 23, 2017

(51) Int. Cl.
| | |
|---|---|
| *G01C 1/08* | (2006.01) |
| *G01C 9/02* | (2006.01) |
| *G01C 17/02* | (2006.01) |
| *F41C 27/00* | (2006.01) |

(52) U.S. Cl.
CPC .............. *G01C 1/08* (2013.01); *F41C 27/00* (2013.01); *G01C 9/02* (2013.01); *G01C 17/02* (2013.01)

(58) Field of Classification Search
CPC .. G01C 1/08; G01C 9/02; G01C 17/02; F41C 27/00
USPC .......................................................... 33/263
See application file for complete search history.

(56) References Cited

U.S. PATENT DOCUMENTS

| | | | | |
|---|---|---|---|---|
| 1,708,397 A | * | 4/1929 | Pidel ......................... | F41G 1/35 |
| | | | | 356/247 |
| 2,389,851 A | * | 11/1945 | Hagner .................... | G01C 1/08 |
| | | | | 33/331 |
| 3,571,567 A | | 3/1971 | Eckermann | |
| 3,752,591 A | * | 8/1973 | Feldman .................. | G01C 1/08 |
| | | | | 356/140 |
| 3,854,037 A | | 12/1974 | Feldman et al. | |
| 4,197,653 A | | 4/1980 | Laxo | |
| 5,159,401 A | | 10/1992 | Decker, Jr. | |
| 7,382,448 B1 | | 6/2008 | Hedrick et al. | |
| 2016/0012290 A1 | | 6/2016 | Lucas | |

* cited by examiner

*Primary Examiner* — Yaritza Guadalupe-McCall
(74) *Attorney, Agent, or Firm* — AFMCLO/JA (57) ABSTRACT

A navigation system operable without a visible horizon is provided. The system can include a collapsible sextant apparatus having a first holder to accommodate a visual spotting scope and a second holder connected to the first holder to accommodate an electronic navigation device. The electronic navigation device can include elevation and timing factors for navigation. The first holder can include a rotatable base extending in a first direction, and a retention element disposed on the rotatable base to retain the visual spotting scope. The second holder can include a longitudinal member to retain the electronic navigation device extending in a second direction substantially perpendicular to the first direction such that the first holder is disposed substantially perpendicular to the second holder and the visual spotting scope and the electronic navigation device can be aligned at a predetermined angle.

20 Claims, 6 Drawing Sheets

NAVIGATION APPARATUS

GOVERNMENT INTEREST

The invention described herein may be manufactured and used by or for the Government of the United States for all government purposes without the payment of any royalty.

BACKGROUND

Field of the Invention

The embodiments herein generally relate to a navigation apparatus, and more particularly to a collapsible sextant apparatus, a sextant apparatus operable without a visible horizon, and an electronic horizonless sextant system.

Background of the Invention

Generally, a sextant is a doubly reflecting navigation instrument used to measure the angle between two visible objects. The sextant is conventionally used to determine an angle between an astronomical object and the horizon for the purposes of celestial navigation. Other instruments have also been used to determine the angle between astronomical objects and the horizon for the purposes of celestial navigation. Two or more observations of different celestial bodies can be used to estimate a navigator's position. When the horizon is not visible, an artificial horizon or electronic sextant can be used to estimate a navigator's position.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides a collapsible sextant apparatus. The apparatus includes a first holder configured to accommodate a visual spotting scope, a second holder connected to the first holder and configured to accommodate an electronic navigation device comprising elevation and timing factors for navigation. The first holder includes a rotatable base extending in a first direction, and a retention element disposed on the rotatable base configured to retain the visual spotting scope. The second holder comprises a longitudinal member extending in a second direction substantially perpendicular to the first direction, wherein the first holder and the second holder are positioned substantially perpendicular to one another.

In the embodiment, the retention element can include a plurality of rotatable arms extending from the rotatable base. The plurality of rotatable arms can rotate with respect to the rotatable base, and the rotatable base can rotate with respect to the second holder. In the embodiment, the second holder can include a side wall abutting the first holder and an adjustable clamp operatively connected to the longitudinal member, where the longitudinal member can extend from the side wall, and the adjustable clamp can slide along the longitudinal member.

The apparatus of the embodiment can further include at least one retaining mechanism operable to secure the electronic navigation device to the second holder. The apparatus of the embodiment can further include a damping element disposed on the first holder configured to grip the visual spotting scope.

In the embodiment, the electronic navigation device can be any of a smartphone and a computer tablet. The rotatable base of the first holder can include a first back surface. The second holder can include a second back surface. The first back surface can be positioned substantially planar to the second back surface in a stowed configuration.

The apparatus of the embodiment can further include a latch element configured to lock the first holder in a plurality of predetermined angles with respect to the second holder.

Another embodiment provides a sextant apparatus operable without a visible horizon. The apparatus includes a first holder configured to releasably clamp a visual spotting scope along an optical axis; and a second holder configured to releasably clamp an electronic navigation device comprising a tilt sensor, a clock, and a geomagnetic compass. The tilt sensor includes a tilt axis, and the first holder is operatively connected to the second holder to dispose the tilt axis at an adjustable angle with respect to the optical axis.

In the embodiment, the first holder can be operatively connected to the second holder to dispose the tilt axis parallel to the optical axis in a first arrangement.

The sextant apparatus operable without a visible horizon of the embodiment can further include a first clamp disposed on the first holder configured to elastically clamp the visual spotting scope aligned along the optical axis; and a second clamp disposed on the second holder configured to elastically clamp the electronic navigation device with the tilt axis at the adjustable angle with respect to the optical axis.

In the embodiment, the first holder can include an upwardly open cradle configured to house the visual spotting scope. The upwardly open cradle can include a base and a plurality of arms extending upward from the base. The second holder can include a slidable clamp configured to urge the electronic navigation device against a sidewall of the second holder in a first direction toward the first holder and clamp the electronic navigation device in a second direction perpendicular to the first direction, while leaving the electronic navigation device unconstrained in a third direction perpendicular to the first and second directions.

Another embodiment provides an electronic horizonless sextant system. The system includes a visual spotting scope disposed on a firearm and comprising an optical axis, an electronic navigation device comprising a tilt sensor, a clock, and a geomagnetic compass, and a first detachable holder comprising a longitudinal axis. The first detachable holder is configured to operatively connect to the firearm and configured to accommodate the electronic navigation device. The optical axis and the longitudinal axis are disposed substantially perpendicular to one another. The visual spotting scope is removably disposed on the firearm, and the electronic navigation device is removably disposed in the first detachable holder.

The system can further include an external tilt sensor disposed on the visual spotting scope. The system can further include a processor configured to receive a first input signal of direction and a first tilt from the tilt sensor, a second input signal of a second tilt from the external tilt sensor, and a third input signal of a celestial body selection visible through the visual spotting scope at time of first and second input signals, and the processor can output a geospatial position based on the first, second, and third input signals.

The system can further include an external tilt sensor and a second detachable holder configured to operatively connect to the firearm and configured to accommodate the external tilt sensor. The second detachable holder and the first detachable holder can be disposed at a predetermined angle with respect to one another, and the tilt sensor can be removably disposed in the second detachable holder.

The system can further include a processor configured to receive a first input signal of direction and a first tilt from the tilt sensor, a second input signal of a second tilt from the external tilt sensor, and a third input signal of a celestial body selection visible through the visual spotting scope at time of first and second input signals, and the processor can output a geospatial position based on the first, second, and third input signals.

In the embodiment, the first holder can include a slidable clamp configured to urge the electronic navigation device against a sidewall of the first holder in a first direction relative to the firearm and clamp the electronic navigation device in a second direction perpendicular to the first direction, while leaving the electronic navigation device unconstrained in a third direction perpendicular to the first and second directions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In the drawings, the size and relative sizes of layers and regions may be exaggerated for clarity. Referring now to the drawings, and more particularly to FIGS. 1A through 3B, where similar reference characters denote corresponding features consistently throughout the figures, there are shown exemplary embodiments.

Embodiments herein provide a celestial navigation device. The celestial navigation device, referred to herein as a sextant apparatus, can identify a position update, that is, a geospatial location. The sextant apparatus can provide several configurations for mounting and angle measurements. For example, the sextant apparatus according to embodiments herein, can be disposed on Picatinny rails (MIL-STD-1913) on rifles, and, for example, the sextant apparatus can be provided in a standalone configuration.

The Picatinny rail, or tactical rail, is a bracket on some firearms that provides a standard mounting platform consisting of rails with multiple transverse slots. The Picatinny rails can mount heavy sights of various kinds, a variety of accessories and attachments, and can be disposed on the rear upper surface (receiver) of long arms, may be either fitted to or machine milled into the upper, side, or lower surfaces of all manner of weapons from crossbows to pistols and long arms, up to and including anti-materiel rifles. Examples of accessories that may be selectively mated to a Picatinny rail include: vertical fore grips, bipods and rests, electro-optical sights, image intensifiers, flashlights, laser designators, and the like. Such accessories may be rapidly mounted to and dismounted from the rail, thus providing an accurate and repeatable quick detachable mounting platform. By way of example, telescopic scopes that are mounted, zeroed, dismounted, and remounted to a Picatinny rail are known to maintain the aforementioned zero within acceptable tolerances. Embodiments of the disclosed sextant apparatus take advantage of the robust and repeatable mount of the Picatinny rail system and may include components configured to attach thereto.

Traditional celestial navigation requires measuring the elevation angle of a celestial object such as a star, planet, sun, moon, and the like or a combination thereof, above the horizon. An accurate time estimate to within a few seconds is required along with a rough estimate of position, and tabulated positions of celestial objects. Some smartphone applications can provide celestial navigation readings by sighting to celestial objects through an aperture of the smartphone with an elevation angle reading taken from an internal tilt sensor, a time reading from an internal clock, along with locally or remotely stored tabulated positions of the celestial objects. Without needing to view the horizon, position updates are possible as long as a celestial object is detectable visually.

Embodiments herein can also utilize input from external tilt sensors to provide more accurate elevation angle measurements.

The embodiments herein provide a sextant apparatus that does not require a visible horizon in order to estimate a user position. Further, the sextant apparatus of the embodiments accommodates various smartphone form factors and can incorporate external sensor elevation angle measurements. As such, a user can determine a rapid, nearly instantaneous, geospatial location update with minimal a priori knowledge of traditional sextant instrumentation operation, including minimal a priori knowledge of constellations or other celestial objects.

When operating in contested GPS signal environments, embodiments of the sextant apparatus herein can provide a robust navigation option. Referring now to the drawings, and more particularly to FIGS. 1A through 3B, where similar reference characters denote corresponding features consistently throughout the figures, there are shown exemplary embodiments.

Figure 1A:
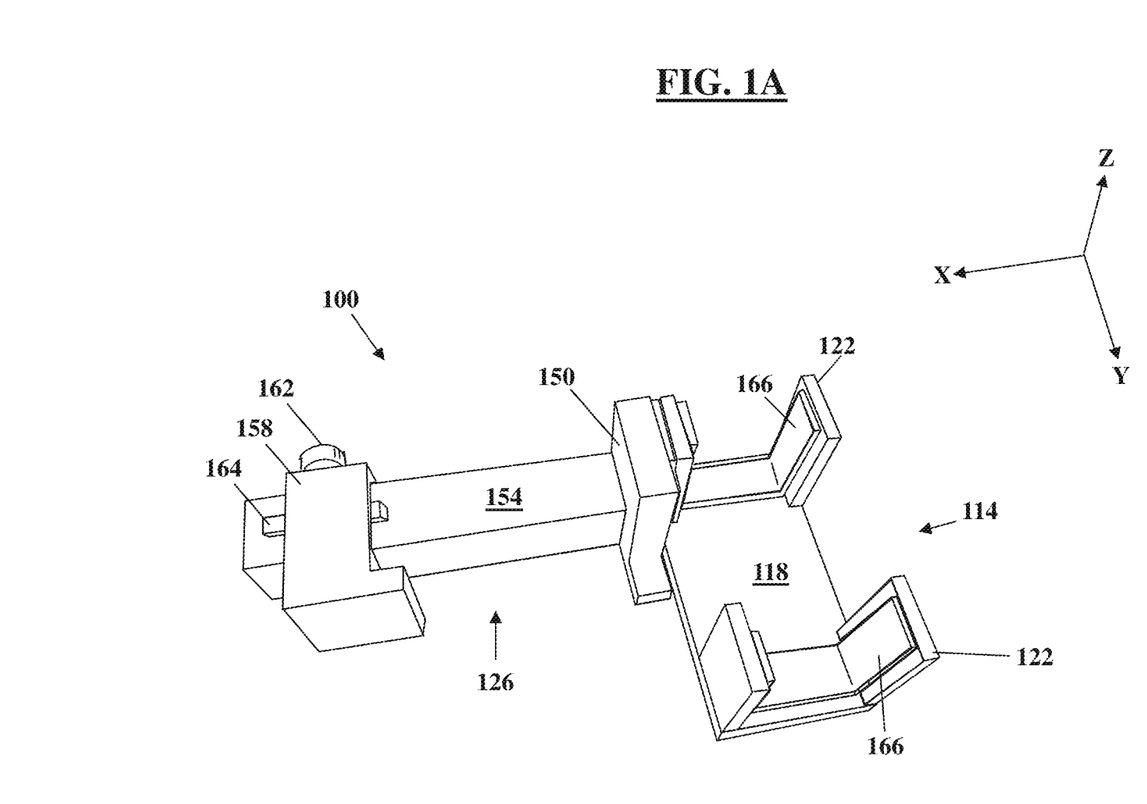
FIG. 1A is a top perspective view of a collapsible sextant apparatus in a deployed configuration according to an embodiment herein.
Figure 1B:
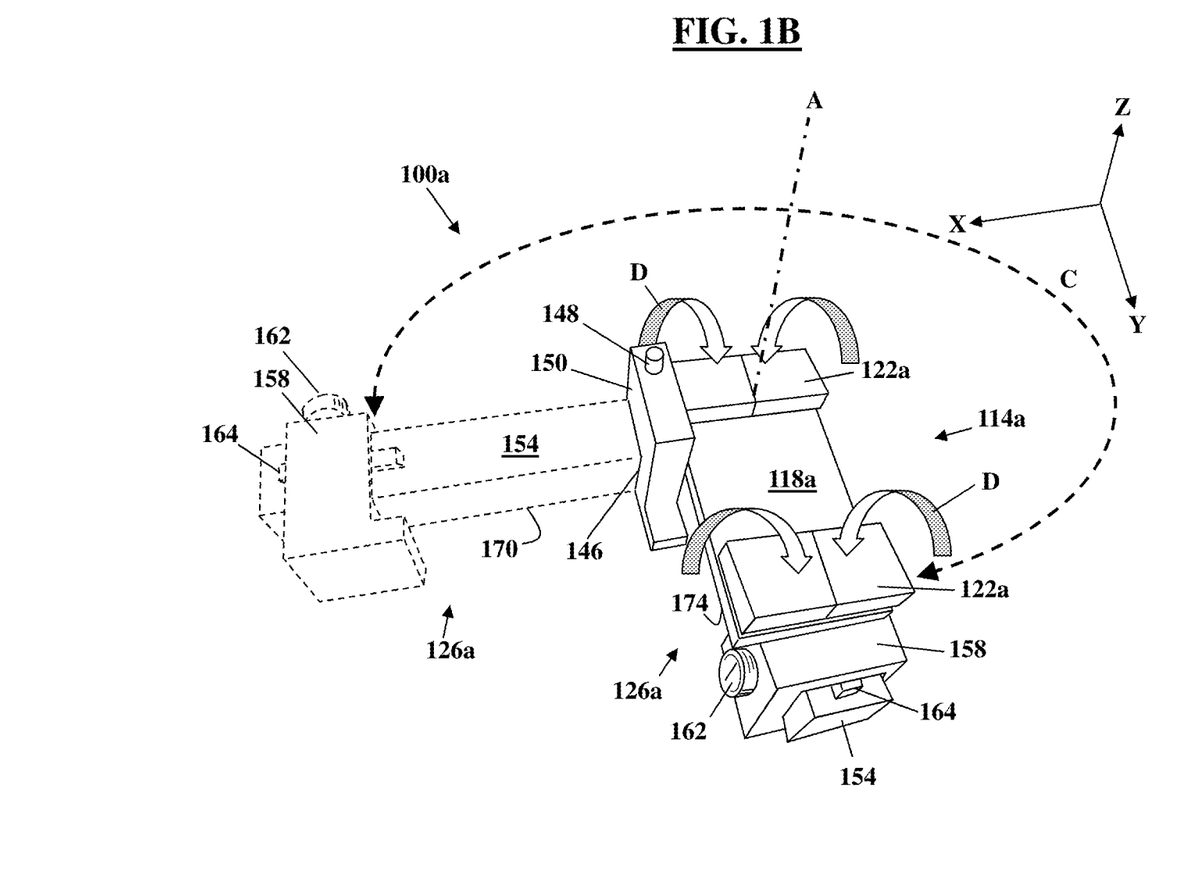
FIG. 1B is a top perspective view of a collapsible sextant apparatus in a folded configuration according to an embodiment herein.

FIG. 1A is a schematic illustration of a sextant apparatus 100 according to an embodiment herein. FIG. 1B is a schematic illustration of a collapsible sextant apparatus 100a in a folded configuration according to an embodiment herein. The collapsible sextant apparatus 100a of FIG. 1B can be unfolded and deployed in a configuration illustrated by the sextant apparatus 100 of FIG. 1A.

The sextant apparatus 100 can include a first holder 114 to accommodate a visual spotting scope 208. The first holder 114 can include a base 118 and a retention element 122 disposed on the base 118. The retention element 122 can retain the visual spotting scope 208 on the base 118 of the first holder 114.

The sextant apparatus 100 can include a second holder 126 connected to the first holder 114. The second holder 126 can accommodate an electronic navigation device 204, such as a communication device, for example, a smartphone, computer tablet, and the like that can deliver appropriate elevation and timing factors for navigation. The electronic navigation device 204 can include a compass, tilt sensor, celestial chart, such as a navigation almanac, stored on a hardware device, and a clock. The stored celestial chart can be in the form of data and stored locally to the electronic navigation device or remotely, for example, accessible via a cellular connection. The first holder 114 and the second holder 126 can be positioned perpendicular to one another. For example, the base 118 of the first holder 114 can extend in a Y direction and the second holder 126 can have a longitudinal member 154 that can extend in an X direction perpendicular to the Y direction. In such an example, the electronic navigation device 204 can be disposed substantially in an XZ plane in the second holder 126 and the visual spotting scope 208 can have an optical axis 178 extending substantially in the Y direction when the visual spotting scope 208 is disposed in the first holder 114, where X, Y, and Z directions are orthogonal to one another. In other words, the base 118 can extend in the Y direction and the longitudinal member 154 can extend in the X direction perpendicular to the base 118.

The retention element 122 can be configured as a plurality of arms extending from the base 118. Alternatively, the retention element 122 can be configured as an interference-fit thermoplastic polyurethane (TPU) cradle, a yoke vise, a quick detach protuberance affixed to scope rings, fixed scope rings having cam-locking halves, and the like, or combinations thereof.

In some embodiments, the second holder 126 can include a side wall 150 abutting the first holder 114, and the longitudinal member 154 extending from the side wall 150. An adjustable clamp 158 can be operatively connected to the longitudinal member 154. The adjustable clamp 158 can slide along the longitudinal member 154 to hold the electronic navigation device 204.

A retaining mechanism 162, such as a set screw, can be disposed in the adjustable clamp 158. Rotation of the retaining mechanism 162 can selectively permit or halt movement of the adjustable clamp 158 with respect to the longitudinal member 154, thus securing the electronic navigation device 204 to the second holder 126. A slide element 164 can provide stability for the adjustable clamp 158 as the adjustable clamp 158 moves along the longitudinal member 154. For example, the slide element 164 can be configured as a ratchet having intermeshing teeth with the adjustable clamp 158, or the slide element 164 can be configured as a foam rubber, smooth plastic, and the like to provide stable motion between the adjustable clamp 158 and the longitudinal member 154.

A damping element 166 can be disposed on the first holder 114 to provide a secure grip between the first holder 114 and the visual spotting scope 208, and dampen; i.e., absorb or suppress vibration of the visual spotting scope 208. The damping element 166 can include a soft spongey material, such as a closed cell polyurethane foam, a foam rubber, woven or non-woven textile, and the like. The damping element 166 can be bonded to the base 118, bonded to the retention element 122, or bonded to the base 118 and the retention element 122 with an adhesive or glue. The damping element 166 can also dampen out vibrations in the sextant apparatus 100, the first and second holders 114, 126 and the visual spotting scope 208.

In some embodiments, the sextant apparatus 100 can include a three-dimension (3-D) printed first and second holders 114, 126 that can accommodate several different sized visual spotting scopes 208 for sighting celestial objects and electronic navigation devices 204 for determining geospatial position. For example, the sextant apparatus 100 can be a lightweight 3-D printed resin material structure.

In some embodiments, the sextant apparatus 100a can be collapsible, as indicated in FIG. 1B. The collapsible sextant apparatus 100a can include a first holder 114a to accommodate a visual spotting scope 208. The first holder 114a can include a rotatable base 118a and a retention element 122a disposed on the rotatable base 118a. The retention element 122a can retain the visual spotting scope 208 on the rotatable base 118a of the first holder 114a.

The collapsible sextant apparatus 100a can include a second holder 126a connected to the first holder 114a. The second holder 126a can be configured to accommodate an electronic navigation device 204. In a deployed arrangement, the first holder 114a and the second holder 126a (illustrated with dashed lines) can be positioned perpendicular to one another. In a folded or stowed arrangement, the first holder 114a and the second holder 126a can be positioned parallel to one another as illustrated in FIG. 1B. The first holder 114a and the second holder 126a are rotatable relative to one another, for example, the second holder 126a is shown as pivoted in FIG. 1B while the first holder 114a remains stationary by dashed arrow "C" about rotation axis "A", but the same folded configuration can be achieved by the second holder 126a remaining stationary and the first holder 114a pivoting in an opposite direction. A contour surface 146 can stop rotation of the first holder 114a relative to the second holder 126a and a latch element 148 can be operable to lock the first holder 114a relative to the second holder 126a in a deployed arrangement, a stowed arrangement, or at a predetermined folded position between the deployed and stowed arrangements.

The rotatable base 118a of the first holder 114a can include a first back surface 170, and the second holder 126a can include a second back surface 174. The first back surface 170 can be positioned in a substantially planar direction planar to the second back surface 174 in the stowed configuration.

The retention element 122a can be configured as a plurality of rotatable arms extending from the rotatable base 118a. Alternatively, the retention element 122a can be configured as an interference-fit TPU cradle, a yoke vise, a quick detach protuberance affixed to scope rings, fixed scope rings having cam-locking halves, and the like, or combinations thereof. The rotatable retention elements 122a can rotate with respect to the rotatable base 118a, and the rotatable base 118a rotates with respect to the second holder 126a. In the stowed arrangement, the retention elements 122a of the collapsible sextant apparatus 100a can be folded as indicated by arrows "D" to the rotatable base 118a to provide a flat configuration for storage, such as in a pocket for convenient transportation, mobility, and accessibility.

In some embodiments, the second holder 126a can include a side wall 150 abutting the first holder 114a, and a longitudinal member 154 extending from the side wall 150. An adjustable clamp 158 can be operatively connected to the longitudinal member 154. The adjustable clamp 158 can slide along the longitudinal member 154 to hold the electronic navigation device 204.

Similar to the embodiment shown in FIG. 1A, a retaining mechanism 162, such as a set screw, can be disposed in the adjustable clamp 158 in the sextant apparatus 100a of FIG. 1B. Rotation of the retaining mechanism 162 can selectively permit or halt movement of the adjustable clamp 158 with respect to the longitudinal member 154, thus securing the electronic navigation device 204 to the second holder 126a. Again, the slide element 164 can provide stability for the adjustable clamp 158 as the adjustable clamp 158 moves along the longitudinal member 154. For example, the slide element 164 can be a ratchet having intermeshing teeth with the adjustable clamp 158, or the slide element 164 can be a foam rubber, smooth plastic, and the like to provide stable motion between the adjustable clamp 158 and the longitudinal member 154.

A damping element 166 (not shown in the collapsed view of FIG. 1B) can be disposed on the first holder 114a to provide a secure grip between the first holder 114a and the visual spotting scope 208, and dampen; i.e., absorb or suppress vibration of the visual spotting scope 208. The damping element 166 can be bonded to the rotatable base 118a, bonded to the retention element 122a, or bonded to the rotatable base 118a and the retention element 122a with an adhesive or glue. The damping element 166 can also dampen out vibrations in the sextant apparatus 100a, the first and second holders 114a, 126a and the visual spotting scope 208.

Figure 2A:
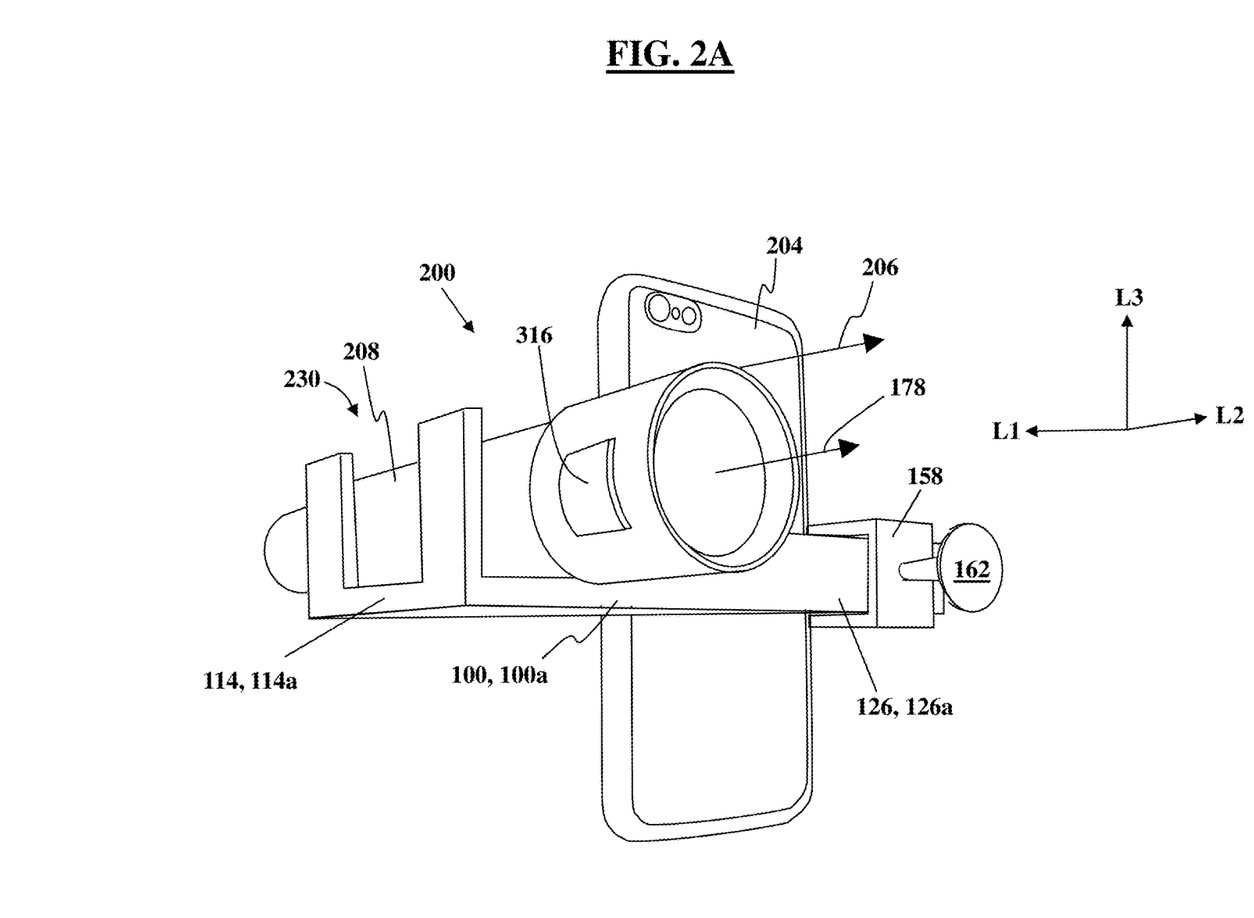
FIG. 2A is a perspective view of a sextant system according to an embodiment herein.
Figure 2B:
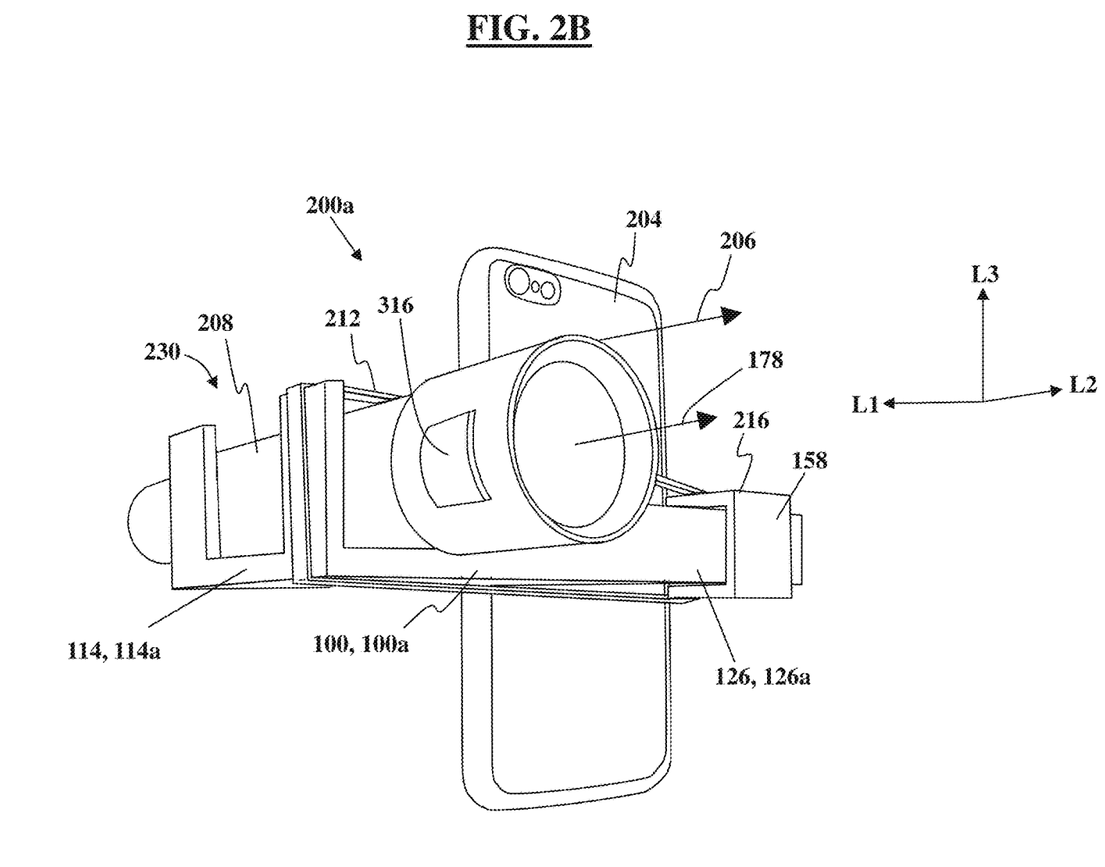
FIG. 2B is a perspective view of a sextant system with a retaining mechanism according to an embodiment herein.

FIG. 2A, with reference to FIGS. 1A and 1B, is a schematic illustration of a sextant system 200 including an electronic navigation device 204 that can deliver appropriate elevation and timing factors for navigation and a visual spotting scope 208 according to an embodiment herein. As used herein, the electronic navigation device 204 that can deliver appropriate elevation and timing factors for navigation may also be referred to as a communication device, and an electronic navigation device such as a smartphone, a tablet computer and the like. Those skilled in the art will appreciate that this terminology is only illustrative and does not affect the scope of the invention. FIG. 2B, with reference to FIGS. 1A through 2A, is a schematic illustration of a sextant system 200a according to another embodiment herein.

As shown in FIGS. 2A and 2B, the embodiments herein further provide a sextant system 200, 200a that can operate without a visible horizon or an artificial horizon. The sextant system 200, 200a can include a sextant apparatus 100, 100a. The sextant apparatus 100, 100a can include a first holder 114, 114a configured to releasably clamp a visual spotting scope 208 along an optical axis 178 and a second holder 126, 126a to releasably clamp an electronic navigation device 204. The electronic navigation device 204 can include a tilt sensor, a clock, and a geomagnetic compass. The tilt sensor can have a tilt axis 206. The tilt axis 206 can register zero tilt angle when the tilt axis 206 is pointed from a geospatial location to the horizon. The tilt axis 206 can register zero tilt in this configuration whether the horizon is visible or not.

The first holder 114, 114a can be operatively connected to the second holder 126, 126a to dispose the tilt axis 206 at an adjustable angle to the optical axis 178. When the tilt axis 206 is aligned with the optical axis 178, the tilt axis 206 can register the angle from the horizon to a celestial body when the celestial body is sighted through the visual spotting scope 208. It will be recognized by one of ordinary skill in the art that elements of the disclosed invention may provide an adjustable structure for orienting the spotting scope 208, electronic navigation device 204, or other elements with respect to each other. However, it will be further recognized that once the sextant system 200, 200a is calibrated, it is desirable to maintain a rigid attachment of the various elements. Any relative motion between, by way of example, the spotting scope 208 and navigation device 204, after calibration, will degrade the accuracy of the sextant system 200, 200a.

In some of these embodiments, the first holder 114, 114a can be operatively connected to the second holder 126, 126a to dispose the tilt axis 206 parallel to the optical axis 178 in a first arrangement. Also, the first holder 114, 114a can be operatively connected to the second holder 126, 126a to dispose the tilt axis 206 perpendicular to the optical axis 178 in a second arrangement.

In some embodiments, the first holder 114, 114a can include a resilient retainer 212 to elastically clamp the visual spotting scope 208 aligned to the first holder 114, 114a along the optical axis 178. The second holder 126, 126a can include a second clamp 216 to elastically clamp the electronic navigation device 204 aligned to the second holder 126, 126a with the tilt axis 206 at the adjustable angle to the optical axis 178.

The first holder 114, 114a can include an upwardly open cradle 230 configured to accept an outer contour of the visual spotting scope 208. The upwardly open cradle 230 can include the base 118, 118a and a retention element 122, 122a extending upward from the base 118, 118a. The retention element 122, 122a can be a plurality of arms. The second holder 126, 126a can include the adjustable clamp 158 to urge a planar shape of the electronic navigation device 204 against the side wall 150 in a first direction L1 toward the first holder 114, 114a and clamp the planar shape of the electronic navigation device 204 in a second direction L2 perpendicular to the first direction L1, while leaving the planar shape unconstrained in a third direction L3 perpendicular to the first and second directions L1, L2.

While the adjustable clamp 158 is described as sliding toward the first holder 114, 114a to urge a planar shape of the electronic navigation device 204 against the side wall 150 in a first direction L1, the embodiments herein are not so limited and it can be understood that the positions of the side wall 150 and adjustable clamp 158 can be interchanged so that the adjustable clamp 158 can be described as sliding away from the first holder 114, 114a to urge a planar shape of the electronic navigation device 204 against the side wall 150 in a negative first direction −L1.

Figure 3A:
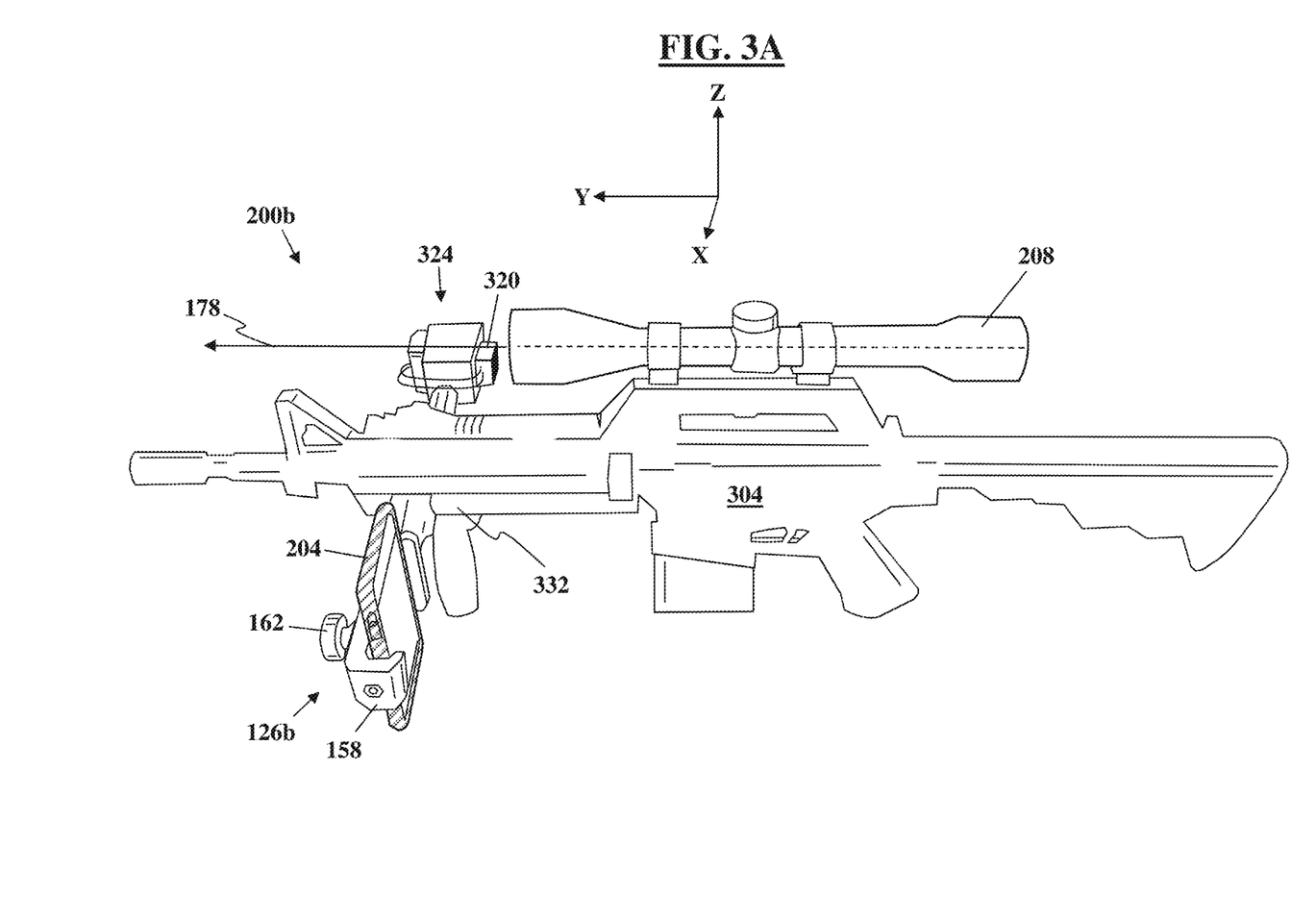
FIG. 3A is a perspective view of a sextant system according to another embodiment herein.
Figure 3B:
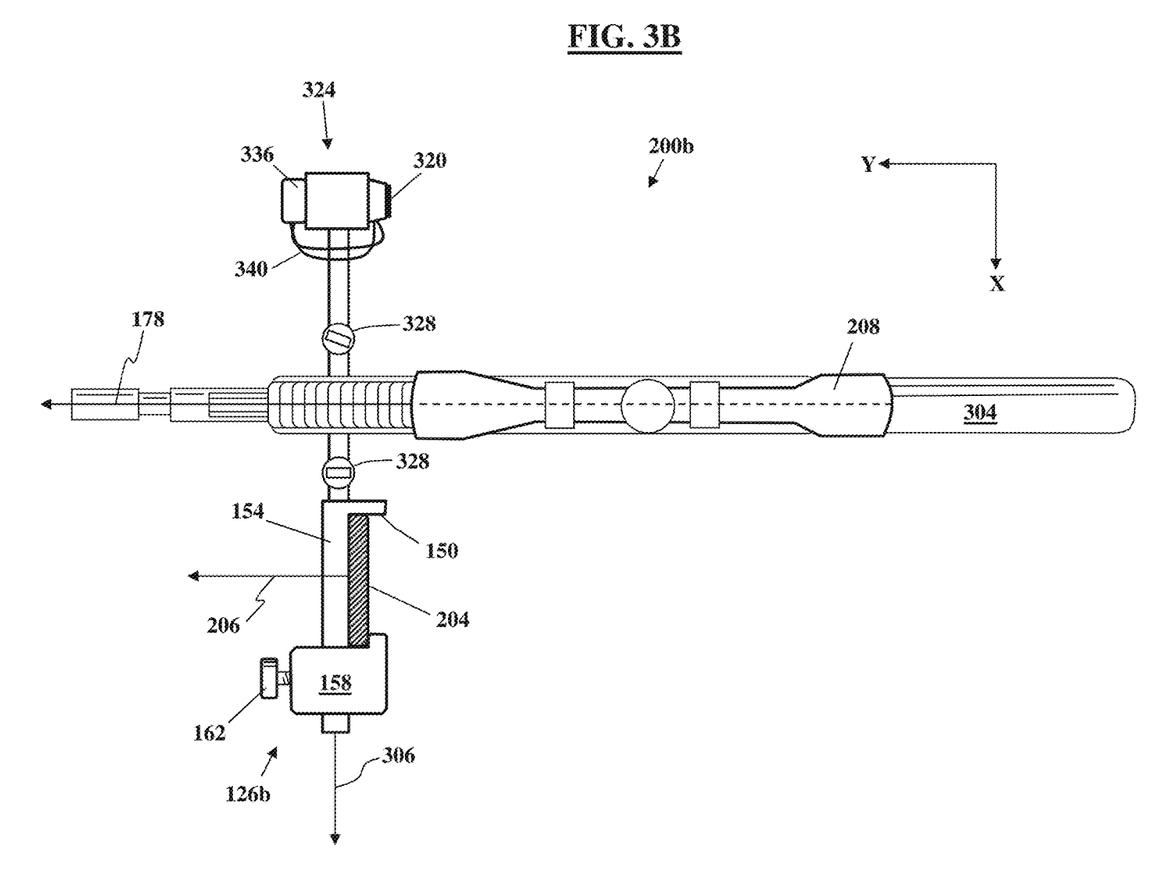
FIG. 3B is a top view of the sextant system of FIG. 3A according to an embodiment herein.

FIG. 3A, with reference to FIGS. 1A through 2B, is a schematic illustration of an electronic horizonless sextant system 200b according to another embodiment herein. The electronic horizonless sextant system 200b can include an electronic navigation device 204, such as a smartphone, computer tablet, and the like, a visual spotting scope 208, and an external tilt sensor 320. FIG. 3B, with reference to FIGS. 1A through 3A, is a schematic illustration of a top view of the electronic horizonless sextant system 200b of FIG. 3A according to an embodiment herein.

The electronic horizonless sextant system 200b can include a visual spotting scope 208 disposed on a firearm 304 and having an optical axis 178, and an electronic navigation device 204 having a tilt sensor, a clock, and a geomagnetic compass. The electronic horizonless sextant system 200b can include a first detachable holder 126b to operatively connect to the firearm 304 and to accommodate the electronic navigation device 204.

In some embodiments, the optical axis 178 of the visual spotting scope 208 disposed on the firearm 304 and the first detachable holder 126b can be disposed perpendicular to one another. For example, the optical axis 178 can extend in a Y direction and the detachable holder 126b can have a longitudinal member 154 that extends along a longitudinal axis 306 of the detachable holder 126b in an X direction perpendicular to the Y direction. In such an example, the electronic navigation device 204 can be disposed substantially in an XZ plane in the detachable holder 126b and the visual spotting scope 208 can have an optical axis 178 extending substantially in the Y direction when the visual spotting scope is disposed on the firearm 304, where X, Y, and Z directions are orthogonal. In other words, the optical axis 178 and the longitudinal axis 306 can be disposed perpendicular to one another.

In some embodiments, the visual spotting scope 208 can be removably disposed on the firearm 304, and the electronic navigation device 204 can be removably disposed in a first detachable holder 126b. The visual spotting scope 208 can be removably disposed on the firearm 304 as described above for the visual spotting scope 208 removably disposed in the first holder 114, 114a. The electronic navigation device 204 can be removably disposed in the first detachable holder 126b as described above for the electronic navigation device 204 disposed in the second holder 126, 126a.

For example, the first detachable holder 126b can include an adjustable clamp 158 configured to urge a planar shape of the electronic navigation device 204 against a side wall 150 in a first direction relative to the firearm 304 and clamp the planar shape of the electronic navigation device 204 in a second direction perpendicular to the first direction, while leaving the planar shape unconstrained in a third direction perpendicular to the first and second directions.

In an embodiment, an external tilt sensor can be aligned with the visual spotting scope 208 optical axis 178. For example, the external tilt sensor can be configured as a first external tilt sensor 316 bonded to the visual spotting scope 208 or a second external tilt sensor 320 disposed in a second holder 324. The second holder 324 can be a detachable holder configured to operatively connect to the firearm 304 and configured to accommodate the second external tilt sensor 320. The second tilt sensor 320 can be removably disposed in the second detachable holder 324. In some of these embodiments, the second detachable holder 324 and the first detachable holder 126b can be disposed at a predetermined angle to one another. Adjustment dials 328 can be adjusted to accurately align the predetermined angles between the first and second holders 126b, 324 and between either one or both of the first and second holders 126b, 324 and the optical axis 178 of the visual spotting scope 208. In some of these embodiments, the first and second detachable holders 126b, 324 are disposed on Picatinny rails 332 of the firearm 304. All rail-mounted items can be quickly attached and removed from firearm 304 so as not to impede operation thereof.

The first and second tilt sensors 316, 320 can include a power source such as a battery 336 and power lines 340.

The electronic horizonless sextant system 200b can include at least one of the first and second external tilt sensors 316, 320. A tilt reading of the external tilt sensor 316, 320 can be compared to a tilt sensor reading of the electronic navigation device 204 to align the optical axis 178 of the visual spotting scope 208 with the tilt sensor of the electronic navigation device 204. The external tilt sensor 316, 320 can utilize a wired or wireless link, for example, a Bluetooth® system, to communicate from the spotting scope 208 to the electronic navigation device 204 (for example, a smartphone). The measured elevation angle can be copied from a Bluetooth® receiving application and pasted into the celestial navigation application by a processor in the electronic navigation device 204. When the electronic navigation device 204 is separate from the visual spotting scope 208, as provided in embodiments herein, mounting requirements can be simplified.

In embodiments, the electronic navigation device 204 can include a processor or a processor can be separate but communicatively coupled to the electronic navigation device 204. The processor can be configured to receive a first input signal of direction and a first tilt from the internal tilt sensor, a second input signal of a second tilt from at least one of the external tilt sensors 316, 320, and a third input signal of a celestial body selection visible through the visual spotting scope 208 at the time of the first and second input signals. The processor can output a geospatial position based on the first, second, and third input signals, for example, after repeating the sighting process to at least three separate celestial objects.

The processor can execute computer code stored on hardware using an operating system such as iOS®, Android®, MS Windows®, Linux®, etc. for example, an operating system of a phone to be utilized, with an appropriate celestial navigation application to output the geospatial position.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A collapsible sextant apparatus comprising:
a first holder configured to accommodate a visual spotting scope, wherein said first holder comprises a rotatable base extending in a first direction, and a retention element disposed on said rotatable base configured to retain said visual spotting scope; and
a second holder connected to said first holder and configured to accommodate an electronic navigation device comprising elevation and timing factors for navigation, wherein said second holder comprises a longitudinal member extending in a second direction substantially perpendicular to said first direction,
wherein said first holder and said second holder are positioned substantially perpendicular to one another.

2. The apparatus of claim 1, wherein said retention element comprises a plurality of rotatable arms extending from said rotatable base, wherein said plurality of rotatable arms rotate with respect to said rotatable base, and wherein said rotatable base rotates with respect to said second holder.

3. The apparatus of claim 1, wherein said second holder comprises:
a side wall abutting said first holder; and
an adjustable clamp operatively connected to said longitudinal member,
wherein said longitudinal member extends from said side wall, and
wherein said adjustable clamp slides along said longitudinal member.

4. The apparatus of claim 1, further comprising at least one retaining mechanism operable to secure said electronic navigation device to said second holder.

5. The apparatus of claim 1, further comprising a damping element disposed on said first holder configured to grip said visual spotting scope.

6. The apparatus of claim 1, wherein said electronic navigation device comprises any of a smartphone and a computer tablet.

7. The apparatus of claim 1, wherein said rotatable base of said first holder comprises a first back surface, wherein said second holder comprises a second back surface, wherein said first back surface is configured to be positioned substantially planar to said second back surface in a stowed configuration.

8. The apparatus of claim 1, further comprising a latch element configured to lock said first holder in a plurality of predetermined angles with respect to said second holder.

9. A sextant apparatus operable without a visible horizon, the apparatus comprising:
a first holder configured to releasably clamp a visual spotting scope along an optical axis; and
a second holder configured to releasably clamp an electronic navigation device comprising a tilt sensor, a clock, and a geomagnetic compass, wherein said tilt sensor comprises a tilt axis,
wherein said first holder is operatively connected to said second holder to dispose said tilt axis at an adjustable angle with respect to said optical axis.

10. The apparatus of claim 9, wherein said first holder is operatively connected to said second holder to dispose said tilt axis parallel to said optical axis in a first arrangement.

11. The apparatus of claim 9, further comprising:
a first clamp disposed on said first holder configured to elastically clamp said visual spotting scope aligned along said optical axis; and
a second clamp disposed on said second holder configured to elastically clamp said electronic navigation device with said tilt axis at said adjustable angle with respect to said optical axis.

12. The apparatus of claim 9, wherein said first holder comprises an upwardly open cradle configured to house said visual spotting scope.

13. The apparatus of claim 12, wherein said upwardly open cradle comprises a base and a plurality of arms extending upward from said base.

14. The apparatus of claim 9, wherein said second holder comprises a slidable clamp configured to urge said electronic navigation device against a sidewall of said second holder in a first direction toward said first holder and clamp said electronic navigation device in a second direction perpendicular to said first direction, while leaving said electronic navigation device unconstrained in a third direction perpendicular to the first and second directions.

15. An electronic horizonless sextant system, comprising:
a visual spotting scope disposed on a firearm and comprising an optical axis;
an electronic navigation device comprising a tilt sensor, a clock, and a geomagnetic compass; and
a first detachable holder comprising a longitudinal axis, wherein said first detachable holder is configured to operatively connect to said firearm and configured to accommodate said electronic navigation device,
wherein said optical axis and said longitudinal axis are disposed substantially perpendicular to one another, and
wherein said visual spotting scope is removably disposed on said firearm, and said electronic navigation device is removably disposed in said first detachable holder.

16. The system of claim 15, further comprising an external tilt sensor disposed on said visual spotting scope.

17. The system of claim 16, further comprising a processor configured to receive a first input signal of direction and a first tilt from said tilt sensor, a second input signal of a second tilt from said external tilt sensor, and a third input signal of a celestial body selection visible through said visual spotting scope at time of first and second input signals, and said processor configured to output a geospatial position based on the first, second, and third input signals.

18. The system of claim 15, further comprising
an external tilt sensor; and
a second detachable holder configured to operatively connect to said firearm and configured to accommodate said external tilt sensor,
wherein said second detachable holder and said first detachable holder are disposed at a predetermined angle with respect to one another, and
wherein said tilt sensor is removably disposed in said second detachable holder.

19. The system of claim 18, further comprising a processor configured to receive a first input signal of direction and a first tilt from said tilt sensor, a second input signal of a second tilt from said external tilt sensor, and a third input signal of a celestial body selection visible through said visual spotting scope at time of first and second input signals, and said processor configured to output a geospatial position based on the first, second, and third input signals.

20. The system of claim 15, wherein said first holder comprises a slidable clamp configured to urge said electronic navigation device against a sidewall of said first holder in a first direction relative to said firearm and clamp said electronic navigation device in a second direction perpendicular to said first direction, while leaving said electronic navigation device unconstrained in a third direction perpendicular to the first and second directions.

* * * * *